(12) United States Patent
Burgess et al.

(10) Patent No.: US 6,404,607 B1
(45) Date of Patent: Jun. 11, 2002

(54) POWER DISTRIBUTION MODULE

(75) Inventors: James P. Burgess, Troy; David J. Pearson, Sterling Heights; Gilbert F. Shultz, Novi, all of MI (US)

(73) Assignee: TMW Enterprises, Inc., Troy, MI (US)

( * ) Notice: Subject to any disclaimer, the term of this patent is extended or adjusted under 35 U.S.C. 154(b) by 1445 days.

(21) Appl. No.: 08/603,680

(22) Filed: Feb. 20, 1996

Related U.S. Application Data

(63) Continuation of application No. 08/237,066, filed on May 3, 1994, now abandoned.

(51) Int. Cl.[7] .................................................. H02H 9/00
(52) U.S. Cl. ........................ 361/58; 361/93.7; 361/93.8
(58) Field of Search ............................... 361/58, 62–64, 361/87, 93, 600, 601, 730, 736, 752, 688, 93.1, 93.2, 93.7, 93.9; 340/825.5, 825.51, 825.06, 825.07, 825.11, 825.16; 307/9.1, 10.1

(56) References Cited

U.S. PATENT DOCUMENTS

| | | | |
|---|---|---|---|
| 4,557,225 A | * 12/1985 | Saques et al. | 361/687 |
| 4,951,250 A | * 8/1990 | Cruickshank et al. | 361/98 |
| 5,065,153 A | * 11/1991 | Tomita et al. | 340/825.5 |
| 5,433,283 A | * 7/1995 | Shultz et al. | 180/197 |

* cited by examiner

*Primary Examiner*—Ronald W. Leja
(74) *Attorney, Agent, or Firm*—Gifford, Krass, Groh, Sprinkle, Anderson & Citkowski, PC

(57) ABSTRACT

A power distribution module is especially suited to vehicular applications. An input/output module port is adapted for connection to an external multiplexed communication path, with transceiver circuitry being operative to send and receive messages over the communication path in digital form. The module is flexible enough to support a standard or user-defined commination protocol. An input is adapted for connection to a source of power. A plurality of controllable power switches are used to selectively route power from the source to a plurality of power output ports each port being associated with one of the switches. Control circuitry, operatively connected to the transceiver circuitry and to each power switch, facilitates the sending and receiving of messages over the communication path and provides control signals to the switches in accordance with a message received.

11 Claims, 5 Drawing Sheets

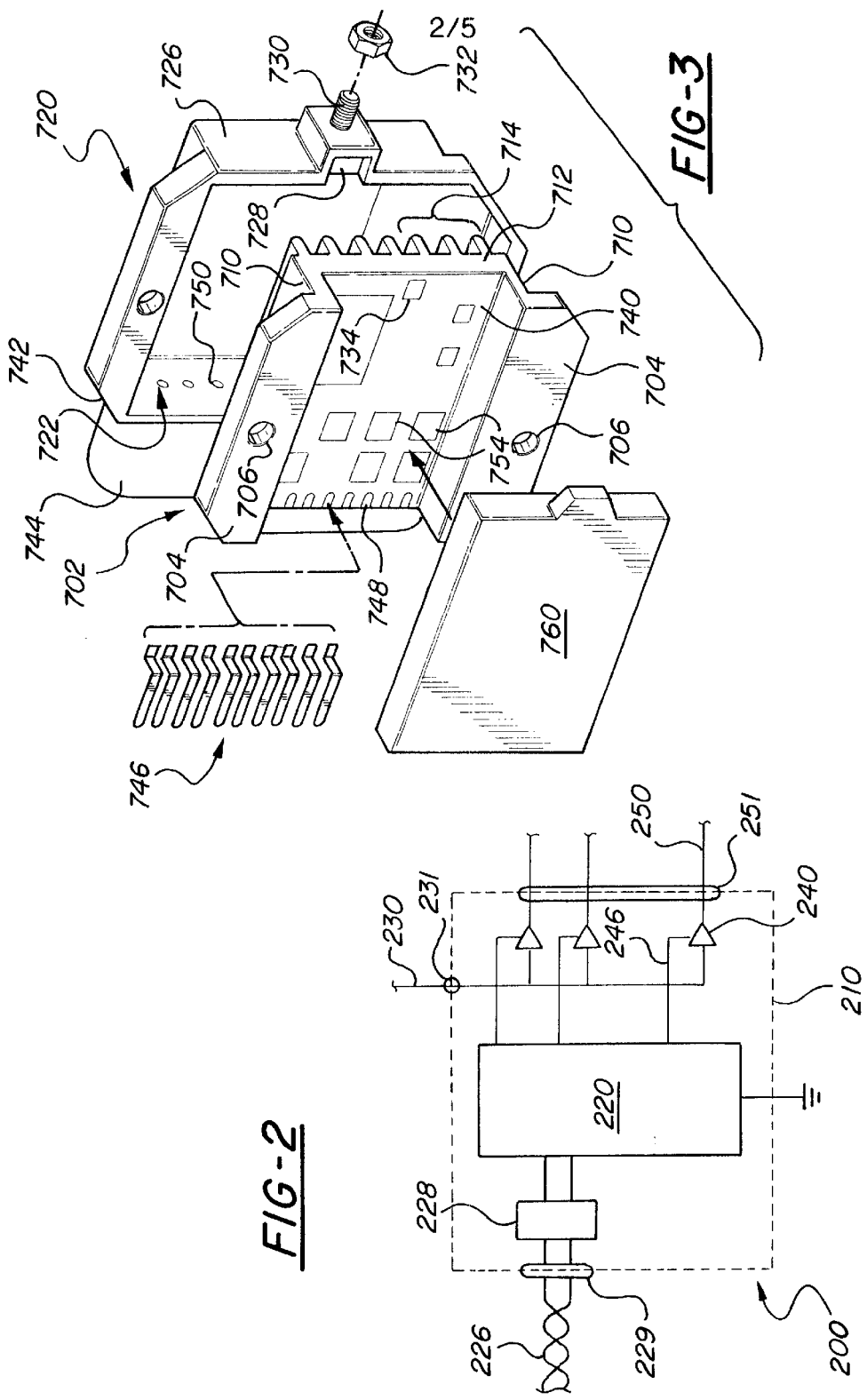

POWER DISTRIBUTION MODULE

This application is a continuation of application(s) Ser. No. 08/237,066 filed on May 3, 1994 now abandoned.

FIELD OF THE INVENTION

This invention relates generally to power distribution and, in particular, to a module capable of receiving a power related command by way of a communications interface and routing power from an input to one of a plurality of outputs in accordance with a command received. The module is particularly useful in vehicular applications, where it may be interfaced to an existing network to simplify interconnections and eliminate wiring.

BACKGROUND OF THE INVENTION

Vehicles such as automobiles have traditionally routed electrical power from a source such as a fuse block or breaker panel to control energy consuming loads via modules including switches and/or relays. Generally the fuses for breaker panel is conveniently located either under the dashboard or in the engine compartment. Many of the controls are located on the dashboard, especially on the driver's side. Other controls may be located closer to their associated loads, as with door-related or seat-related devices.

With today's automotive technology, including complex safety features, climate control and operational devices, extremely complex wiring harnesses have resulted. Over the past 15 years, various approaches have been taken to reduce the number of wires and cables, thereby simplifying the manufacturing process, including lead dress requirements. Reducing the number of higher power cables in favor of low power signal lines adds a further advantage of reducing vehicle weight.

One way to limit the number of high power cables and to reduce the amount of wiring in general is to utilize multiplexing systems whereby control signals are exchanged among switching units and loads distributed throughout the vehicle, instead of having a separate power line for each load radiating from the central fuse box or breaker panel.

An early multiplex system for a vehicle is described in U.S. Pat. No. 3,864,578. This system includes an encoder unit preferably disposed at the head of the vehicle's steering column at or near the hub of the steering wheel which provides a timing signal and a code signal which are responsive to the position of operator actuable controls. A plurality of substantially identical decoders receive both the timing and code signals and provide a plurality of outputs driving relay means for selectively energizing vehicle components. This system improved on the existing prior art by offering a standby mode of operation wherein the decoder and encoder means draw no significant current and by warning an operator in case of failure of any controlled loads such as a brake lamp. However, this system is essentially synchronous in at a timing signal is delivered to all decoders with the code signal being interpreted with respect to this timing signal. As such, serious reliability problems could result from the use of this system in the event an incorrect synchronous signal were transmitted to all connected receivers. This system also requires that a plurality of high gain actuators, which together comprise the relay means, are connected in line with each load.

The system described in U.S. Pat. No. 4,156,151 provides an electrical energy distribution system for motor vehicles in which a single power line having an associated single control line can be used to feed a plurality of remote control units to which a plurality of current consumers are connected. A central control unit generates coded pulse signals for identifying the current-consuming load and means are provided for decoding signals received at a remote control unit associated with a group of selected power consumers. This system, however, is very complex and relies upon discrete components to monitor pulses contained in square waves in order to properly decode the address of a remote control unit. The system is therefore prone to error and difficult to expand, particularly if numerous analog controls are required.

A more recent vehicle multiplex system is disclosed in U.S. Pat. No. 4,845,708. In this system, both power buses and control buses radiate from the fuse block and the control buses interconnect a controller with numerous input and output units distributed about the vehicle. Preferably, the controller selects one of the control buses as an active bus at any given time and isolates the remaining control buses both from the active control bus and from the controller in order to improve system reliability and reduce electromagnetic interference. This system suffers from the need for multiple input and output circuits which are functionally different from one another. Also, as with all the prior art so far referenced, these input and output circuits are not intelligent enough to facilitate two-way communication over a sophisticated communication path, whether using a proprietary or standard protocol.

SUMMARY OF THE INVENTION

The present invention is a power distribution module, especially for vehicular applications, including an input/output port adapted for connection to an external multiplexed communication path. The module includes transceiver circuitry connected to the input/output port operative to send and receive messages over the communication path in digital form, and the module is flexible enough to support a standard or user-defined communication protocol.

The module further includes an input for connection to a source of power, a plurality of power output ports, and a plurality of controllable power switches, each associated with one of the power output ports, each power switch being operative to route power from the source of power to an associated power output port in accordance with a control signal. Control circuitry, operatively connected to the transceiver circuitry and to each power switch, facilitates the sending and receiving of messages over the communication path through the transceiver circuitry, and in accordance with a received message, provides a control signal to a specific power switch, causing power to be routed from the power source to the output port associated with that switch. Fault-detection circuitry is included to compare signals representative of messages being sent and received and provide a fault signal to the control circuitry in the event of contention between the messages being sent and received.

In a preferred embodiment, the module is entirely contained within an enclosure having an integral heat sink in thermal communication with the power switches. A power input connector is provided on the enclosure to receive incoming power from a source of power, and a plurality of power-output terminals are provided on the enclosure, each terminal being adapted for connection to a power-consuming load. The power switches preferably take the form of solid-state devices such as power MOSFET, including two-level charge-pump circuitry operative to boost the voltage provided to the gate of the MOSFET in order to deliver a desired, predetermined voltage through the associated power-output port yet conserve energy during quiescent periods.

The control circuitry may be implemented either as a general-purpose microcomputer or alternatively, as more dedicated circuitry for example, in the form of an application-specific integrated circuit or using programmable array logic. In the event that a microcomputer is used, the module may further include a timer reset circuit configured to receive a signal from the controller and reset the controller in the event that the signal is not received. For example, this circuit may include a low-frequency oscillator which continuously attempts to reset the controller unless an inhibit signal is supplied by the controller.

The module preferably further includes output protection circuitry operative to sense the current through a power switch and turn of the switch if the current through the switch exceeds a predetermined value. Circuitry capable of detecting open-load conditions or excess temperature may alternatively be provided. Voltage regulation circuitry may also be included to convert an incoming voltage into a voltage for use within the module, for example if the control circuitry is implemented with a microcomputer configured for a lower-voltage supply.

BRIEF DESCRIPTION OF THE DRAWINGS

FIG. 2 is a block diagram of one of the power distribution modules depicted in FIG. 1;

FIG. 3 is a drawing which illustrates a preferred physical realization of a power distribution module;

DETAILED DESCRIPTION OF THE PREFERRED EMBODIMENT

The present invention relates generally to distributed power control, and in particular, to a versatile, intelligent module capable of receiving commands through a communications interface and routing power from an input to one of a plurality of outputs in accordance with commands received.

Figure 1:
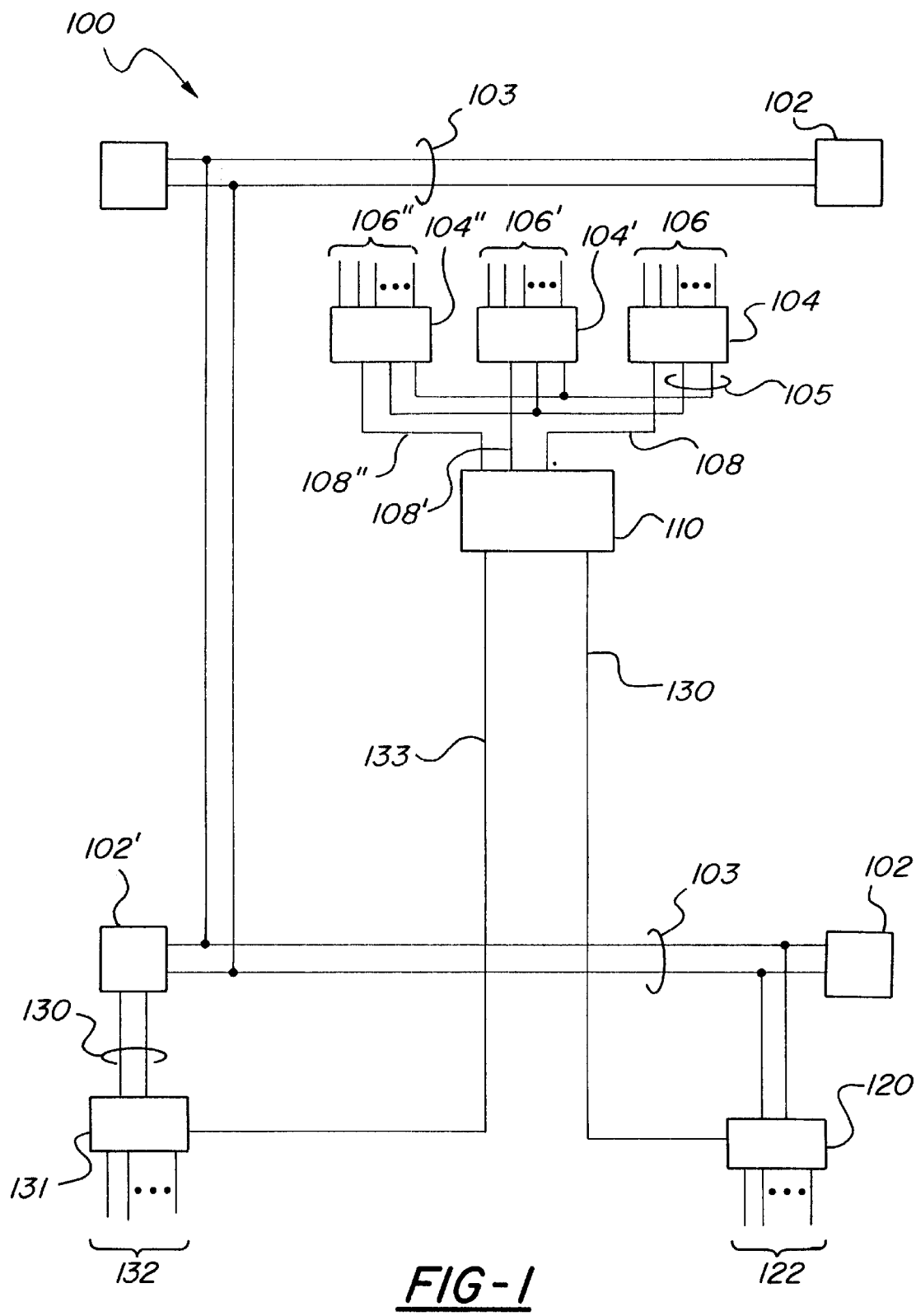
FIG. 1 is a block diagram which represents ways in which information and power may be distributed in accordance with the present invention.

FIG. 1 shows at 100 several ways in which this module may be configured within an environment requiring power distribution. One such environment, for example, might be in a vehicular application, though other uses will be evident from the following discussion.

Environment 100 may include an existing communication network to which modules of the present invention may advantageously be interfaced. Such an existing network is shown in FIG. 1 as nodes 102 communicating over path 103. These nodes 102 may take the form of either centralized or distributed network facilities, some being general-purpose in nature while others are dedicated to specific tasks. Additionally, path 103 may support asynchronous or synchronous communications, either via parallel interface or a serial link, such as a twisted pair, in which case data multiplexing may typically be employed.

In vehicular applications, one such existing network comprising nodes 102 and paths 103. Transmissions over paths 103 may use standard protocols, including those supplied by major manufacturers. For example, in the case of the Ford Motor Co., the standard corporate protocol or SCP interface and associated data structures may be employed, which use a twisted, dual wire currently operating at approximately 42 kbps. A detailed description of this particular, interface is contained within Ford Engineering Specification documents. Document. SCS-SCP-001, for example, details SCP data structures and interface requirements. Document SDS-SCP-002 provides the subsystem design specification for the SCP diagnostic system, and SDS-SCP-003 explains network implementation requirements. These documents are generally available to outside vendors for the purpose of developing SCP-related equipment, and are incorporated herein by reference.

Broadly, the SCP system facilitates the interconnection of multiple electronic data communication modules as nodes within a vehicle using an open architecture network approach. SCP operates in a single-level network topology wherein all nodes are interconnected over a the backbone. In FIG. 1, this is depicted by nodes 102 and routing paths 103. SCP data is encoded using pulse width modulation with a generic frame format including a start segment, priority type, target address, source address, a message of variable length, a cyclic redundancy check (CRC) segment, in-frame resolution bytes, and an end of frame delimiter. Additional information concerning this particular protocol and its conformance to ISO standards may be ascertained from the Ford documents mentioned above. The present invention claims no portion of this existing network, but rather, may be programmed and configured so as to intentionally interact with a wide variety of existing protocols available from numerous sources, whether standard or proprietary.

Continuing the reference to FIG. 1, module 104, represents a power distribution module constructed and programmed in accordance with the present invention. This module 104 may communicate directly with other such modules 104' and 104" over communication path 105. This illustrates the case where the, modules of the present invention may interact with one another independent of other networks such as that depicted by nodes 102 and path 103. Each distribution module, such as module 104, is connected to a source of power 110 which, for example might take the form of a power distribution block, fuse block or a direct connection to a power source such as a battery, depending upon the specific configuration. In response to information communicated via lines 105, power from source 110, routed to module 104 over thicker line 108, will be distributed to one or more outputs 106 of module 104. In like manner, modules 104' and 104", receiving power over lines 108' and 108", will deliver power to their respective outputs 106' and 106" in accordance with commands received over communication path 105.

Module 120 in FIG. 1 shows the case where a module formed according to, the present invention 120 is connected directly to an existing communication network over path 103 and, in accordance with commands received therefrom, routes power through thicker line 130 to one or more of its associated outputs 122. Yet another configuration is possible, that being a direct connection of the present invention module to a node of an existing network, but without using the network to which the existing node is interfaced. Module 131 illustrates this situation, wherein an entirely separate communication path 130 is used to communicate with node 102' and, in accordance with commands received, routes power from thicker line 133 to one or more of its outputs 132.

In summary the module of the present invention may support an existing single- or multi-level network or, depending upon the specific requirements and circumstances, may be used to form single- or multi-level network topologies, including star and ring architectures, whether of the masterless or master/slave configuration.

FIG. 2 is a simplified block diagram used to illustrate major operational features associated with a single module formed in accordance with this invention. The module overall, shown at 200, includes an enclosure represented by a broken line 210, within which control circuitry 220 is used to activate a plurality of power switches, one being depicted at 240 and being controlled by controller 220 over line 246. The controller 220 is conveniently implemented with a single-chip microcomputer of conventional design, in the preferred embodiment this being a high-speed C-MOS device such as the MC68HC805C8, available from Motorola, Inc., though other devices from other manufacturers such an Intel and Texas Instruments are equally applicable, as are non-microprocessor-based control solutions.

The communication interface to module 200 is shown by a twisted pair 226, which interfaces to the controller 220 via communications interface 228 through connector 229 supported on enclosure 210. Power is received to the module through thicker line 230 and terminal 231, which is then routed to each of the switches 240 and additionally to the controller 220 via line 234. Each of the switches 240 is responsible for routing power received via input 230 to an output terminal associated with a particular power switch, such as along line 250 associated with switch 240. The output terminals are preferably integral to a single connector 251 supported on enclosure 210.

FIG. 3 illustrates in oblique view a preferred physical realization of a power distribution module formed in accordance with the present invention. A bracket 702, formed of a heat-conductive material such as aluminum, is angled as shown in FIG. 3 so as to include outwardly extending tabs 704 with mounting holes 706. These tabs 704 are connected to side walls 710 which in turn are connected to a generally rectangular plate 712 having fins 714. Various modifications to this structure are possible, for example, with regard to the size and shape of the tabs 704, the dimensions of side wails 710 and the overall geometrical configuration of fins 714. For example, in an alternative construction it may be possible to use plate 712 with fins 714 alone, foregoing the need for side walls 710 and separate tabs 704, as these tabs may be solely provided on the outer enclosure collar 720 which will now be described. This collar 720 includes side surfaces which support various connectors and terminals which will subsequently be described, and includes a through aperture 722 into which the angled bracket 702 is inserted. One outer side surface 726 is configured to receive a bolt 728 having protruding threads 730 onto which nut 732 is placed. This nut/bolt combination forms the power input terminal previously described with regard to the electrical aspects of the invention, and makes contact to a pad 734 on printed circuit board 740. A connection between the bolt 728 and pad 734 is not shown, and may take advantage of various connection mechanisms, including mechanical pressure, soldering, and so forth.

Supported on another outer surface 742 is a molded shape 744 within which power output terminals 746 are placed. These terminals 746 connect to corresponding pads 748 on circuit board 740, preferably through a soldered connection. With these terminals 746 affixed to their corresponding pads the circuit board/bracket assembly is installed into the collar 720 by first inserting the terminal 746 into apertures 750, then hinging the input terminal end of the bracket finally into the collar. Holes 750 may be replaced with a slot or other configuration to facilitate the introduction of more than one terminal at a time.

The plate 712 has an upper surface which preferably includes heat radiative fins 714, and an opposing lower surface against which circuit board 740 mounts. This circuit board 740 is preferably double-sided with certain of the electrical components 754 being mounted on the side visible in FIG. 3, and with other components, such as those sensitive to temperature or need of dissipating thermal energy being mounted between the circuit board and the lower surface of the plate 712. For example, the power switches previously described would typically be sandwiched between the circuit board and the bracket lower surface. Although the connector associated with the communications port is not visible in FIG. 3, this, too, would be provided on an outer surface of collar 720, for example next to connector shape 744 on surface 742. Alternatively, this communications connector may be supported on surface 726 or the other two side walls associated with the outwardly extending tabs. Once bracket 702 has been properly inserted into collar 726 a sealing member 760 may be installed into the bottommost portion of the assembly so as to protect the circuit board 740 and components mounted thereupon. This element 760 is optional, however and may be replaced with some form of liquid potting material or, possibly eliminate it all together.

Figure 4:
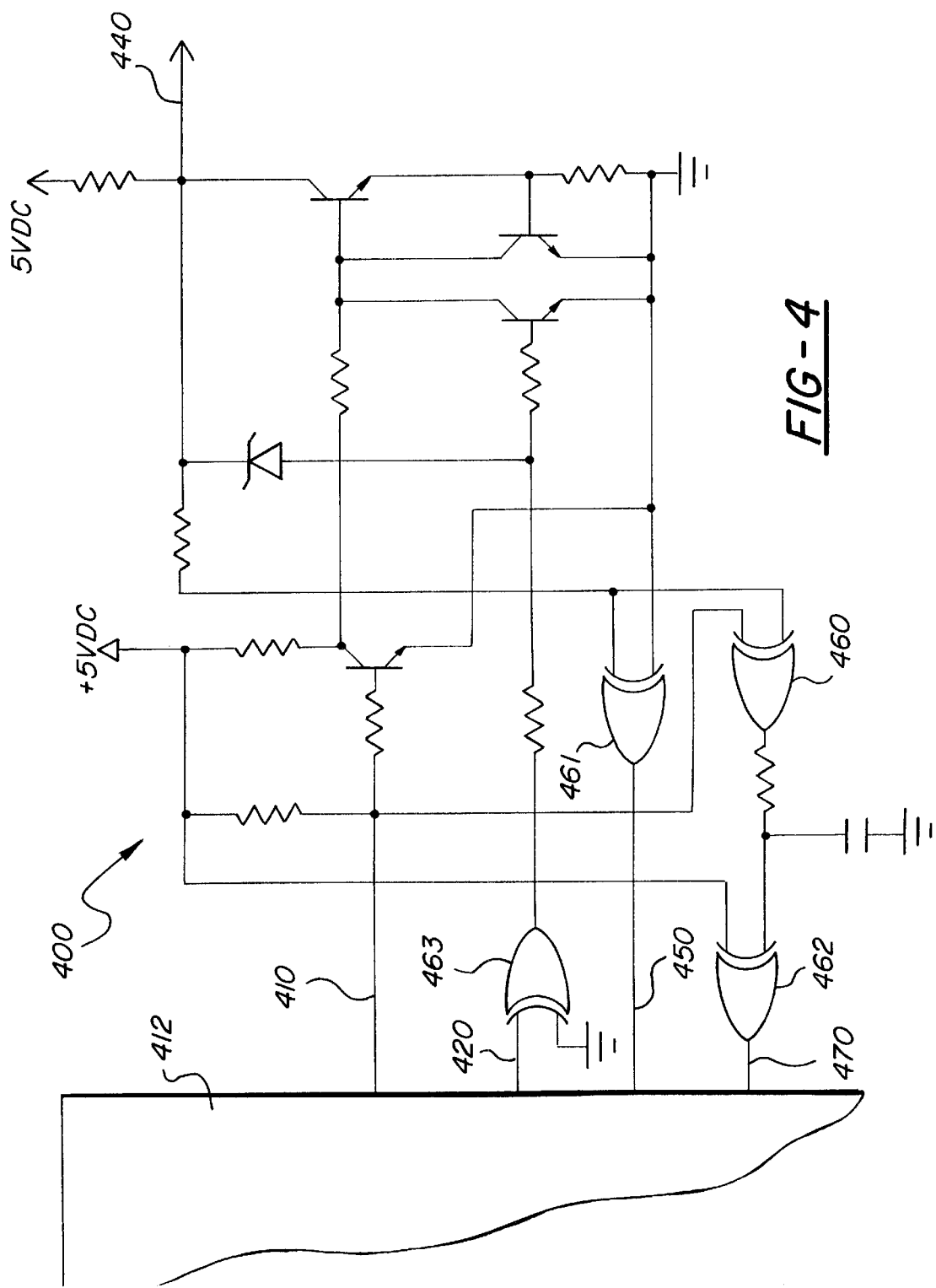
FIG. 4 is a detailed schematic diagram of a preferred multiplex transceiver contained within each power distribution modules for the purpose of bidirectional communication.
Figure 5:
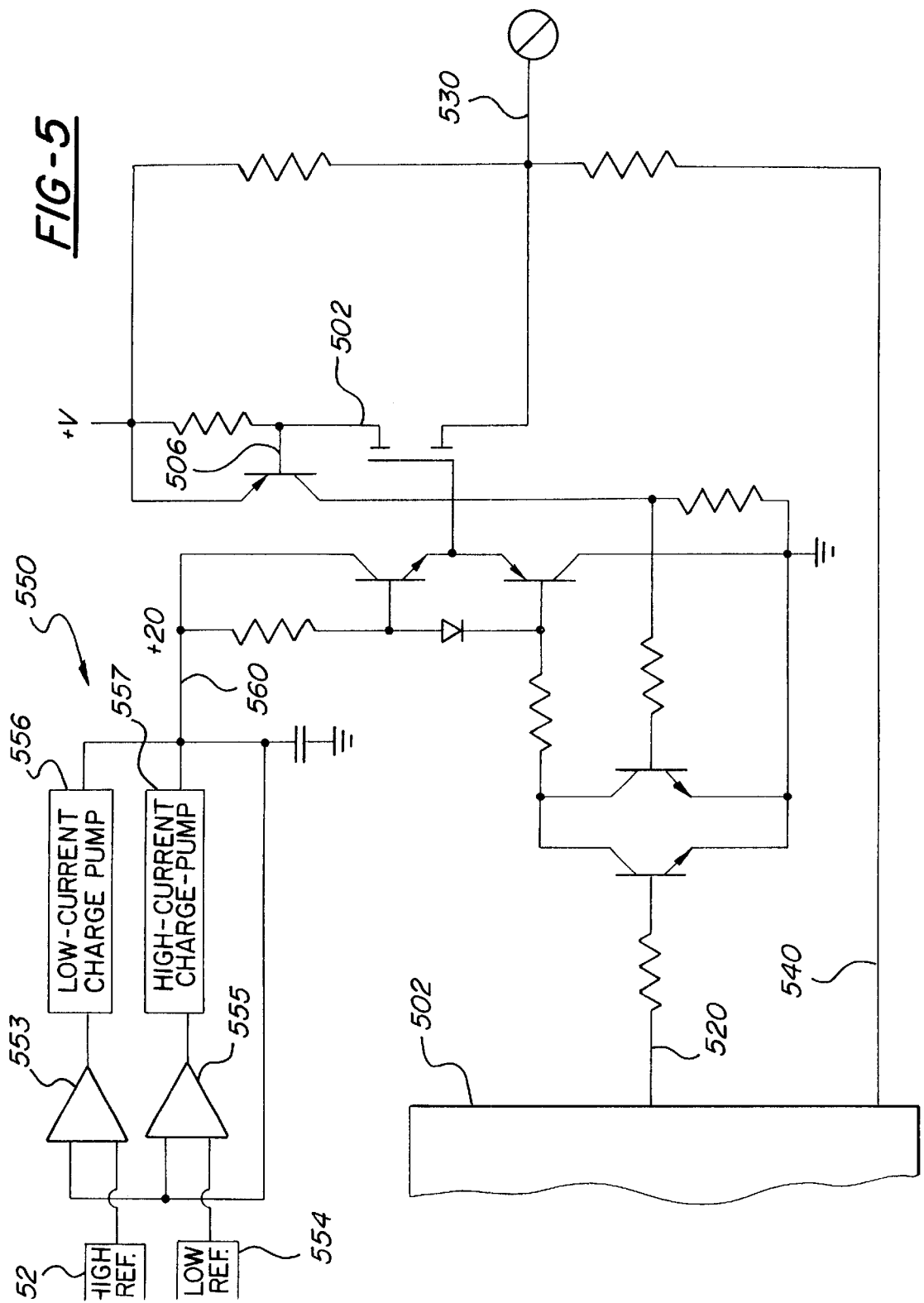
FIG. 5 is a detailed schematic diagram of a preferred power switch used to route power to one of a plurality of output terminals.
Figure 6:
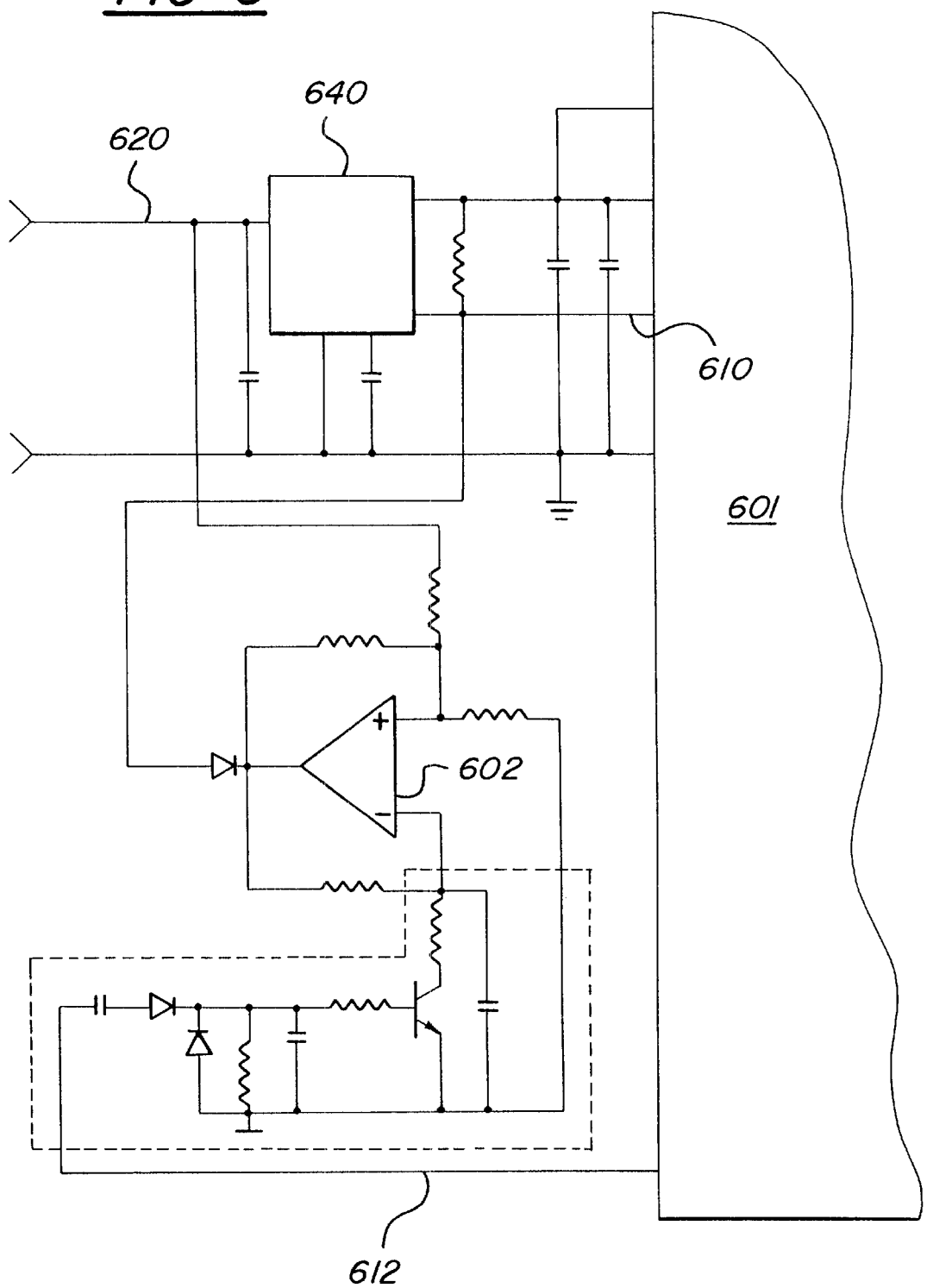
FIG. 6 is a schematic diagram which illustrates a preferred voltage regulation and reset/watchdog circuit.

FIGS. 4 through 6 illustrate in more detailed form preferred implementations of the circuits introduced in FIG. 2. FIG. 4, for example shows a detailed schematic of a communications controller in the form of a multiplexed transceiver circuit 400. This particular implementation is designed to be fault-tolerant, priority arbitrating, and sufficiently rugged to meet the demands of vehicular applications. The circuit 400 will withstand continuous shorts to either ground or power up to 24 volts in both forward and reverse directions. Load dump protection is also provided.

The communications protocol makes use of a non-return to zero (NRZ) encoding which is well known to those skilled in electronic communications. The output NRZ signal is delivered along line 410 from microcomputer 412, to a pair of transistors Q1 and Q2 which drive multiplex line 440. Input communications are fed to microcomputer 412 along line 450 through resistor R9 and exclusive-OR gate 461 which is configured as a non-inverting buffer. The NRZ information is then converted by control circuitry or microcomputer 412 in accordance with software programmed therein. The output delivered along line 410 is connected to a pair of 10 K resistors R1 and R2. R1 provides a pull, up to a 5-volt supply, to guarantee that the driver transistor Q2 is turned off during power up and initialization. Resistor R2 provides drive to the inverter transistor Q1, which in turn drives the output stage Q2 via R4. R3 provides current to Q1 which pull the output of Q2 high through R5 to its non-asserted state. The particular type of transistor used for the application of Q2 may be adjusted in accordance with operational demands. Note that input line 450 both monitors what is being transmitted via multiplex line 440 and detects incoming information from the network via resistor R9. In the event that contention is detected, microcomputer 412 will output a signal along line 420, through exclusive-OR gate 463 and resistors R8 and R7, driving transistor Q4 to shut down the output device Q2.

Transistor Q3 and resistor, R6 provide current limiting protection for Q2 in the event that the output 440 is shorted as a result of some fault. Load dump protection is provided by zener diode Z1 as a threshold reference, with resistor R7 providing current limiting to turn off transistor Q4 and the output driver Q2 during load dump. This shunts the drive current away from output driver Q2, effectively turning it off.

Fault detection is accomplished with exclusive-OR gate 460, which is used to test whether the plurality of both the transmission and reception signals are the same. However, due to system capacitances and other considerations, output line 440 will not in practice be capable of responding immediately. As a consequence, the fault gate 460 may detect an error even though one has not occurred. Therefore, this type of error is effectively time integrated by resistor R10 and capacitor C1, thus enabling the system to stabilize before actually reporting an error to the microcomputer 412. The output of the integrator C1/R10 is stabilized and inverted by another gate 462 before presenting it to the microcomputer 412 along line 470.

FIG. 5 illustrates one of the power switches depicted as devices 240 in FIG. 2, this preferred implementation being fault-tolerant as well as short-circuit-proof. As a driver device, the circuit preferably utilizes an N-channel power MOSFET, such as an MTP3055EL, as shown in the output stage. In operation, the output 520 of microcomputer 502 drive is transistor Q4 to the ON state, driving the Q1–Q2 pair to a low output level, and turning off the output stage. When line 520 is driven low, Q4 is turned off which allows the output of the Q1–Q2 output to rise, which in turn asserts the output device Q3. Open-circuit fault detection is accomplished via R7 and R8. When the output is off, R7 pulls up on the output pin, but the weak drive capability associated with R7 is overcome by the load. However, if the load is not connected or if the load is open, the weak drive provided by resistor R7 will put the appropriate logic level at the output 530. For example, if a load is not connected, the output 530 will nevertheless be pulled up to battery potential which will be sensed at input 540 of microcomputer 502 via resistor R8.

The short-circuit protection associated with the output of the power switch will now be described. In the event that the output is shorted to ground, a voltage will be developed across R6 in direct proportion to the amount of current being sourced by MOSFET Q3. This voltage is directly coupled to the base 506 of transistor Q6, with the base-emitter threshold voltage being used to detect when the current limit has been exceeded. For example, with a value of R6 equal to 0.03 Ohm, transistor Q6 will turn on for a current of 20 amps. When this threshold is reached, the current through Q6 overcomes the pull-down resistor R5. When R5 is driven positive by approximately 0.6 volts, it drives current into Q5 via R4 causing transistor Q5 to turn on. When Q5 turns on, it lowers the output of the Q1–Q2 predriver stage, effectively turning off the output driver Q3.

A two-level charge pump circuit 550 includes two reference voltages, a high reference 552 and a low reference 554, each reference feeding one input to two-input voltage comparators 553 and 555, respectively. High reference 552 feeds comparator 553 which, in turn, enables a low current charge pump 556 coupled to the power MOSFET gates through line 560. Low voltage reference 554 feeds a second comparator 555 used to enable a high current charge pump 557 connected in parallel with the low-current charge pump 556, also in communication to the MOSFET gates along line 560. Although the characteristics of this circuit may be varied in accordance with the reference voltage values, and so forth, in a preferred embodiment comparator 553 will turn on and enable low current charge pump 556 at a nominal voltage of 8 volts and turn off at a nominal voltage of 10 volts. Comparator 555, on the other hand, will turn on and enable the high current charge pump at a nominal voltage of 7 volts and turn off at a nominal voltage of 8.5 volts. Using this circuit, a low drain current will be supplied to the MOSFET gates during electrically quiet or quiescent periods, but if a voltage between 7 and 8.5 is realized, the high-current charge pump 557 will be activated, thus enabling the power switches to properly route current from the input to one or more of the power outputs.

FIG. 6 depicts in schematic form a regulator and watchdog timer circuit. Battery voltage is applied to a single-chip regulator 640 which supplies an output voltage in the range of 4.75 to 5.25 volts DC, this being well within the requirements of 5-volt microcomputer 601. Such single-chip regulators are widely available from commercial manufacturers including Motorola, National Semiconductor, Texas Instruments and others. The preferred regulator includes a delayed reset output which is shown along line 610 as it enters microcomputer 601. When battery voltage is applied to the input of regulator 640 along line 620, the reset line 610 is asserted, holding the microcomputer 601 in a safe, controlled state. As the battery voltage rises, capacitor 65 is charged with a current source internal to the regulator device 640. When the voltage across this capacitor reaches a predetermined threshold, indicating that the device 640 is supplying voltage in the proper range, the reset output is no longer asserted, allowing microcomputer 601 to function normally. However, if the voltage falls low enough to cause the regulator to fall out of regulation, the reset output is again asserted, placing the microcomputer known safe state. In practice, reset occurs within a few hundred millivolts prior to the regulator dropping out of regulation, and a reset line 610 will remain asserted until the voltage returns to a safe value. At this point, the delay function will be activated, and the microcomputer will be taken out of its reset condition in an orderly fashion. The regulator 640 also protects the electronics from reverse battery and load dumps, assuming they do not exceed ±80 volts.

The watchdog circuit 604 uses an oscillator incorporating a comparator 602, which forces the microcomputer to change the state of the watchdog output 612 at a certain minimum rate in order to keep from being reset. If the microcomputer does not come alive the oscillator will continue to oscillate at the low-frequency. rate 5 Hz, which will keep resetting the microcomputer five times per second until it wakes up. Current for the charging portion of the oscillator is provided by resistor R1 which is connected directly to the 12 volt battery input. The configuration shown in FIG. 6 thus also conveniently performs a low battery voltage inhibit function. AC coupling is used between the oscillator and the reset line 610 to prevent the oscillator from being defeated if the output of the computer stabilizes at either a logic one or zero state, thereby rendering it ineffective. In operation, the output 612 of the microcomputer 601 is converted to a pulse by the shaping network 620 shown in the broken-line rectangle. Under normal conditions, this pulse consistently discharges capacitor C, keeping the output of the oscillator 602 in the logic one state. However, if the pulse does not arrive in time the oscillator will change state, driving the output to a logic zero, which is passed through the diode, to reset the input of the computer along line 610.

During normal operation, the system is continuously powered from the vehicle battery system over line 620.

Since the reset circuitry is designed to activate when the battery voltage drops below a predetermined reset threshold, the reset circuitry never actuates as long as battery voltage is maintained. However, during the life of a typical vehicle, the battery supply may dip below the thresholds, for example if the battery has been discharged or disconnected. In the event this occurs, the system will go into an automatic reset mode, placing all outputs such as 530 in FIG. 5 into a known, predetermined safe state. When the battery voltage is restored, the reset to the microcomputer along line 610 will be removed at the appropriate time to allow normal operation.

Having thus described our invention, we claim:

1. A power distribution module, comprising:
   an input/output port adapted for connection to an external multiplexed communication path;
   transceiver circuitry connected to the input/output port operative to send and receive messages over the communication path in digital form;
   an input for connection to a source of power;
   a plurality of power output ports;
   a plurality of controllable power switches, each associated with one of the power output ports, each power switch being operative to route power from the source of power to an associated power output port in accordance with a control signal; and
   a controller operatively connected to the transceiver circuitry and to each power switch, the controller being operatives to perform the following functions:
   send and receive messages over the communication path through the transceiver circuitry, and
   provide a control signal to a specific power switch in accordance with a received message, causing power to be routed from the power source to the output port associated with that switch.

2. The power distribution module of claim 1, further including fault detection circuitry operative to compare signals representative of messages being sent and received and provide a fault signal to the controller in the event of contention between the messages being sent and received.

3. The power distribution module of claim 1, wherein the controllable power switches are implemented as power MOSFETs, the module further including charge-pump circuitry shared by a plurality of the MOSFETs, the charge pump being operative to boost the voltage provided to the gate of a MOSFET in order to deliver a desired, predetermined voltage through the associated power-output port.

4. The power distribution module of claim 1, further including output protection circuitry operative to sense the current through a power switch and turn off the switch if the current through the switch exceeds a predetermined value.

5. A power distribution module for vehicular applications, comprising:
   an enclosure;
   an input/output connector supported on the enclosure to interface with an external, bidirectional communication path; a
   plurality of power-output terminals supported on the enclosure, each terminal being adapted for connection to a load associated with the operation of the vehicle;
   a power input connector supported on the enclosure configured to receive incoming power from a source of power;
   digital communication circuitry disposed within the enclosure and connected to the input/output connector, the digital communication circuitry being operative to:
   send and receive messages over the bidirectional communication path,
   monitor the signals present on the communication path, and
   output a fault signal if a message is received while one is being sent;
   a plurality of solid-state power switches disposed with the enclosure, each associated with one of the power output terminals, each power switch being operative to route power from the power input connector to an associated power output terminal in response to a control signal;
   output protection circuitry contained with the enclosure, the circuitry being operative to sense the current through a power switch and turn-off that switch if the current through the switch exceeds a predetermined value; and
   control circuitry disposed within the enclosure, the control circuitry being operative to:
   send a message to the digital communication circuitry, causing the message to be placed on the communication path through the input/output connector;
   receive a message over the communication path, through the input/output connector, and from the digital communication circuitry;
   provide control signals to the power switches in accordance with a received message, and
   receive the fault signal from the digital communication circuitry and inhibit an outgoing message in the event of contention on the bidirectional communication path.

6. The power distribution module of claim 5, further including a heat sink integral to the enclosure.

7. A power distribution module adapted for use with an existing vehicular communication network characterized in having a plurality of distributed nodes which communicate along a bidirectional message routing path according to a predetermined protocol, the module comprising:
   an input/output port adapted for direct connection to the network, including communication circuitry operative to send and receive messages over the network;
   an input for connection to a source of power;
   a plurality of power output ports, each adapted for connection to a power-consuming load in the vehicle, wherein at least one of the power output ports supplies power to one of the nodes of the existing network;
   a plurality of controllable power switches, each associated with one of the power output ports, each power switch being operative to route power from the source of power to a power-consuming load in the vehicle through an associated power output port in accordance with a control signal; and
   a controller connected to the communication circuitry and to each power switch, the controller being operative to:
   interpret messages received over the existing network;
   provide a control signal to a specific power switch in response to a received message relating to the activation of a load, causing power to be routed from the power source through the output port associated with that switch for delivery to that load, and
   format an outgoing message in accordance with the protocol used by the existing network.

8. A distributed vehicular power-control system, comprising:
   a first, existing network characterized in having a plurality of nodes which communicate by way of a first bidirectional routing path;

a plurality of power-control modules interfaced to the first network, each power-control module including an input-output communications port, a power-input port, and a plurality of power-output terminals, each power-output terminal being adapted for connection to a power-consuming load within the vehicle, each power-control module being operative to selectively route power from the power-input port to the nodes and to the loads connected thereto in response to a message received through the input-output communications port.

9. The distributed vehicular power-control system of claim 8, wherein at least one power-control module is interfaced to the first network through a direct connection between the input-output communications port of the module and the first bidirectional routing path.

10. The distributed vehicular power-control system of claim 8, wherein at least one power-control module is interfaced to the first network through a direct connection between the input-output communications port of the module and a single node of the existing network.

11. The distributed vehicular power-control system of claim 8, wherein the power-control modules communicate with one another over a second network connecting the input-output ports of the modules, but wherein at least one of the modules further functions as a gateway to the existing network.

* * * * *

UNITED STATES PATENT AND TRADEMARK OFFICE
CERTIFICATE OF CORRECTION

PATENT NO. : 6,404,607 B1
DATED : June 11, 2002
INVENTOR(S) : James P. Burges et al.

It is certified that error appears in the above-identified patent and that said Letters Patent is hereby corrected as shown below:

Column 4,
Line 10, replace "particular, interface" with -- particular interface --.
Line 12, replace "Document. SCS-" with -- Document SCS-" --
Line 43, replace "the, modules" with -- the modules --.
Line 59, replace "to,the" with -- to the --.

Column 5,
Line 47, replace "wails" with -- walls --.

Column 6,
Line 53, replace "pull, up" with -- pull up --

Column 7,
Line 1, replace "resistor, R6" with -- resistor R6 --.
Line 28, replace "drive is" with -- drives --

Column 8,
Line 33, replace "microcomputer known" with -- microcomputer a known --
Line 47, replace "low-frequency. rate" with -- low-frequency rate, --

Column 9,
Line 29, replace "operatives" with -- operative --.
Line 58, replace "path; a" with -- path; --

UNITED STATES PATENT AND TRADEMARK OFFICE
CERTIFICATE OF CORRECTION

PATENT NO.   : 6,404,607 B1
DATED        : June 11, 2002
INVENTOR(S)  : James P. Burges et al.

It is certified that error appears in the above-identified patent and that said Letters Patent is hereby corrected as shown below:

<u>Column 10,</u>
Line 15, replace "turn-off" with -- turn off --

Signed and Sealed this

Fourteenth Day of January, 2003

JAMES E. ROGAN
*Director of the United States Patent and Trademark Office*